July 5, 1927. 1,635,136
F. F. MOLIÉ
SEPARATION OF CARAMELS
Filed March 7, 1923
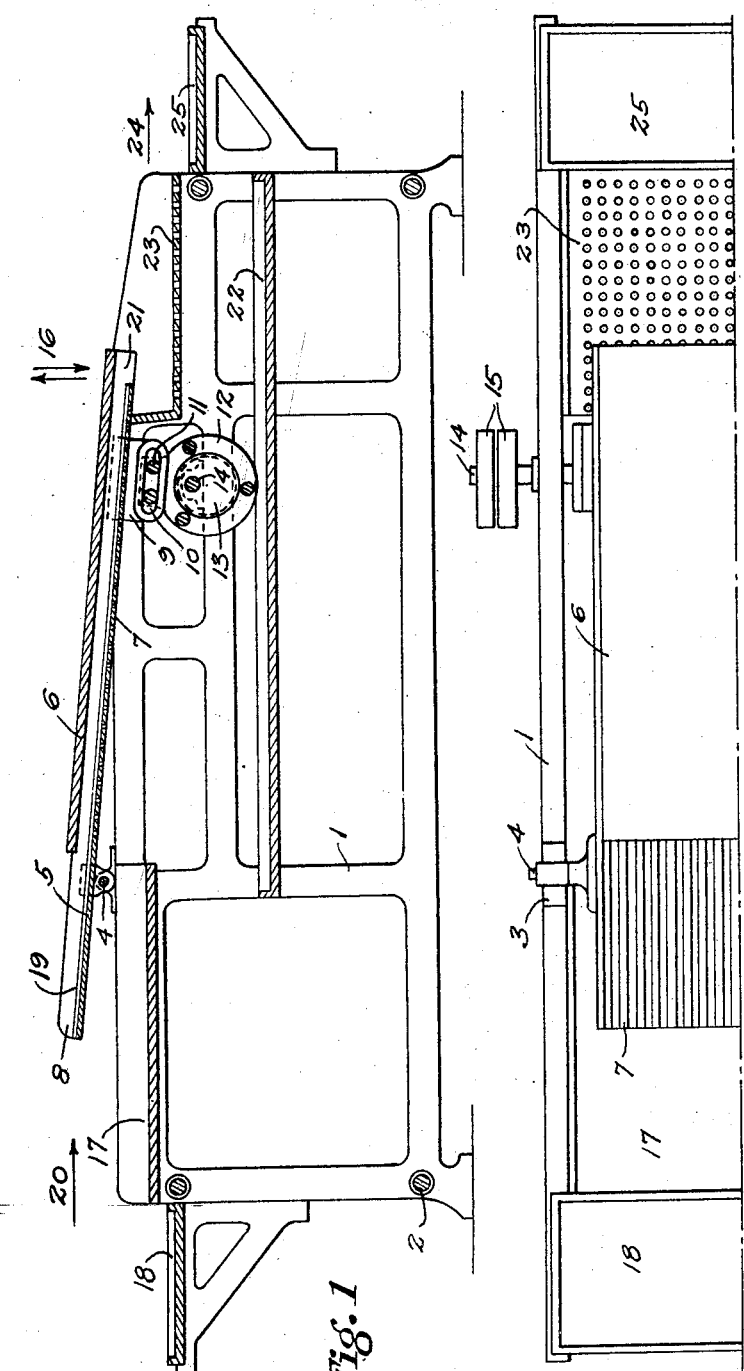
F.F.Molié
INVENTOR.
BY Marks & Clerk
ATTORNEYS.

Patented July 5, 1927.

1,635,136

UNITED STATES PATENT OFFICE.

FRANÇOIS FERDINAND MOLIÉ, OF GENOA, ITALY.

SEPARATION OF CARAMELS.

Application filed March 7, 1923. Serial No. 623,528.

It is known that caramels are prepared substantially as follows:

Immediately the caramel paste has been obtained by any known process, it is made to pass, after suitable treatment, in the form of a thin layer through a machine which produces the division of the aforementioned paste, into as many pieces as there are caramels required.

A similar operation is often effected by means of a machine with knives or rollers which serve to engrave suitable transverse and longitudinal lines upon the layer of caramel paste. This operation, however, does not achieve complete separation of the various pieces intended to form the caramels, but the said pieces remain connected to one another by a very thin layer of paste.

Up to the present the separation of the caramels has been done by hand, which has necessitated considerable manual labor, and has caused considerable expense in addition to loss of material from fragments, etc.

The object of the present invention is to provide an automatic machine by which increased production, perfect and sure separation of the caramels, and complete utilization of the fragments which always form during the said operation are obtained, so that the latter is effected consequently in a more rational, hygienic and economical manner than hitherto.

The machine according to the present invention is based on the principle that for the object of obtaining the separation of the engraved layer into caramels, it is sufficient to shake the layer between two surfaces disposed at a distance slightly greater than the thickness of the layer. For the purpose of obtaining such operation more easily, one at least of the surfaces is furnished with longitudinal grooves (in the direction of the grooves left by the aforesaid machine with knives or rollers).

Another object of the invention is to increase the intensity of the shock of the layer against the surfaces as it advances into the machine and finally to ensure separation before the layer has completely traversed the machine. One feature of the invention consists in providing the lower of the two surfaces between which the layer is shaken with a series of holes suitable for allowing the cuttings which are inevitably produced during manufacture, to pass into a suitable receptacle while the caramels which are detached from the layer fall into another part of the machine, the said part being also provided with holes for a further and complete sifting of the said caramels from any fragments remaining.

Another feature of the invention is that the two surfaces between which the layer of paste is shaken, are downwardly inclined so that the caramels which become detached from the said layer automatically fall out of the machine.

These objects are obtained by arranging the two surfaces to be joined by a convenient framework, and by making the whole device oscillate about a horizontal axis. The lower surface at least is corrugated and perforated while the whole device, by means of an eccentric or in any other convenient manner, is made to oscillate about the aforesaid axis, and as the latter is inclined towards the base, it allows the caramels to strike automatically the mouth of the outlet of the same part which is disposed on the lower shaft of the part which is normally in an inclined position. If any fragments are too large for sifting in the first phase of the operation, they fall with the detached caramels, into another sieve provided with slightly larger holes in order that the caramels may be completely freed from cuttings.

An embodiment of the invention is represented by way of example in the annexed sheet of drawings in which:

Fig. 1 shows a part vertical section of the machine, and

Fig. 2 shows a half-plan thereof.

Fig. 3 is a sectional elevation of the machine.

On referring to the drawing it will be seen that 1 represents the frame of the machine, which is constituted substantially by two supports attached to one another by the tie-rod 2. On each of the supporting parts a lug 3 is arranged so as to carry one of the pivots 4 which are attached to the shaking portion 5, constituted substantially by two surfaces 6 and 7 of which the upper one 6 is the shorter, while the lower one 7 is corrugated, and perforated. The two surfaces 6 and 7 are connected by the side plates 8 forming therewith a narrow space for the passage of the layer to be made into caramels.

At the lower extremity of the shaking portion 5 there are arranged, one on each side, two plates 9 each of which carries a slot 10. In this slot are positioned the fixing devices 11, arranged on the ring 12 of an eccentric 13 mounted on the shaft 14 which is operated by a pulley 15.

The fixing device is arranged to give to the box constituted by the surfaces 6, 7 and 8, an oscillating movement in the direction of the arrows 16 round the pivot 4.

The layer of paste to be made into caramels on arrival at the machine, is put upon the plane surface 17. The workman removes from the said layer by means of a suitable knife, all fragments, putting them in a small removable tray 18. The layer thus prepared is placed on an inclined plane 19 constituted substantially by an extension of the bottom of the shaking portion. Thus the layer of paste, either on account of the oscillating movement round the pivot 4 or owing to the inclination of the bottom 7 is obliged to move in the direction of the arrow 20 and when it has entered between the surfaces 6 and 7 it is shaken repeatedly between them. Moreover, the further the said layer moves towards the outlet 21, the strength of the shock which it receives becomes continually greater, thus ensuring the separation of the caramels, before their arrival at the outlet 21. The cuttings which form during the shaking process pass through the holes provided in the surface 7 and fall into the receiving tray 22. Cuttings which are larger and in consequence can not pass through the holes in the surface 7, emerge with the caramels from the mouth 21 and fall on to the plate 23. By means of the operator's hand, or an equivalent mechanical device, the caramels are moved in the direction 24 towards the small removable tray 26, while the cuttings fall through the holes arranged in the plate 23 and collect in the receiving tray 22. The caramels collected in 25 are ready for removal to wrapping machines.

The invention is not limited to the precise form described and illustrated, provided that it is based upon the principles above set forth.

Having now particularly described and ascertained the nature of my said invention and in what manner the same is to be performed, I declare that what I claim is:

1. In an apparatus for separating caramels, a shaking device provided with two surfaces spaced apart a distance slightly greater than the thickness of a previously scored slab of confectionery material, said surfaces being arranged to gradually feed the material downwardly toward one end of the two surfaces when the surfaces are vibrated, and means for alternately moving the surfaces up and down to cause said slab to successively abut against the opposite surfaces.

2. An apparatus as claimed in claim 1 in which the shaking device is provided with corrugations arranged lengthwise of one of said surfaces.

3. A method of separating the caramels from a partly separated layer of caramels consisting in moving a layer of partly separated caramels between upper and lower impact surfaces while causing said surfaces to reciprocate in a vertical plane, discharging broken portions from the caramel layer through one of said surfaces, and finally discharging the caramels from between said surfaces.

FRANÇOIS FERDINAND MOLIÉ.